(12) United States Patent
Kodialam et al.

(10) Patent No.: US 7,710,953 B2
(45) Date of Patent: May 4, 2010

(54) METHOD AND APPARATUS FOR OPERATING FAST SWITCHES USING SLOW SCHEDULERS

(75) Inventors: Muralidharan Sampath Kodialam, Marlboro, NJ (US); Tirunell V. Lakshman, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 383 days.

(21) Appl. No.: 11/693,825

(22) Filed: Mar. 30, 2007

(65) Prior Publication Data

US 2008/0240139 A1 Oct. 2, 2008

(51) Int. Cl.
*H04L 12/50* (2006.01)
*H04Q 11/00* (2006.01)
(52) U.S. Cl. .................................. 370/369
(58) Field of Classification Search ................ 370/369
See application file for complete search history.

(56) References Cited

U.S. PATENT DOCUMENTS

| 6,519,225 | B1 * | 2/2003 | Angle et al. ............... 370/229 |
| 2001/0033581 | A1 * | 10/2001 | Kawarai et al. ........... 370/468 |
| 2002/0039364 | A1 * | 4/2002 | Kamiya et al. ............ 370/389 |
| 2002/0048280 | A1 * | 4/2002 | Lee et al. .................. 370/468 |
| 2002/0061027 | A1 * | 5/2002 | Abiru et al. ............... 370/413 |
| 2005/0036502 | A1 * | 2/2005 | Blanc et al. ............... 370/412 |

OTHER PUBLICATIONS

Bill Lin and Isaac Keslassy, "The Concurrent Matching Switch Architecture," IEEE Infocom '06, Barcelona, Spain, Apr. 2006.

* cited by examiner

*Primary Examiner*—Dang T Ton
*Assistant Examiner*—Frederick Ott
(74) *Attorney, Agent, or Firm*—Wall & Tong, LLP (57) ABSTRACT

The invention includes an apparatus and method for switching packets through a switching fabric. The apparatus includes a plurality of input ports and output ports for receiving arriving packets and transmitting departing packets, a switching fabric for switching packets from the input ports to the output ports, and a plurality of schedulers controlling switching of packets through the switching fabric. The switching fabric includes a plurality of virtual output queues associated with a respective plurality of input-output port pairs. One of the schedulers is active during each of a plurality of timeslots. The one of the schedulers active during a current timeslot provides a packet schedule to the switching fabric for switching packets through the switching fabric during the current timeslot. The packet schedule is computed by the one of the schedulers active during the current timeslot using packet departure information for packets departing during previous timeslots during which the one of the schedulers was active and packet arrival information for packets arriving during previous timeslots during which the one of the schedulers was active.

20 Claims, 5 Drawing Sheets

METHOD AND APPARATUS FOR OPERATING FAST SWITCHES USING SLOW SCHEDULERS

FIELD OF THE INVENTION

The invention relates to the field of communication networks and, more specifically, to scheduling for input-queued switches.

BACKGROUND OF THE INVENTION

As the volume of Internet traffic continues to grow, telecommunications equipment providers and telecommunications service providers continue working to increase network transmission capacity between switches and switching capacity within switches. The rapid growth in network transmission capacity, however, has shifted the network bottleneck from network transmission capacity to switching capacity. Due to the need to rapidly scale switching capacity to match the fast growth of network transmission capacity, high-speed switch architectures have been intensely studied recently. The most common types of switches include shared-memory switches, output-queued switches, and input-queued switches.

A basic issue in scaling switching capacity is memory-bandwidth, particularly for output-queued switches since speed-up proportional to switch size is required at the output ports. While input-queued switches do not inherently require such speedup, input-queued switches may have throughput bounds due to output port contention. The potential of input-queued switches for maintaining good switching performance with reduced memory-bandwidth requirements (as compared to shared memory switching architectures and output-queued switching architectures) have made input-buffered switches preferred for high-speed switching applications. Disadvantageously, however, existing input-queued switches have numerous issues impacting both switch stability and switching throughput.

While input-queued switches avoid the requirement of large speed-up at the output ports, a major bottleneck in scaling input-queued switches is the scheduler needed to keep the input-queued switch stable and achieve high throughput. Several approaches have been proposed to solve this problem, including pipelining the implementation, reducing the frequency of scheduling computations, and eliminating the scheduler altogether using a two-stage load-balancing architecture. Such approaches, however, fail to keep the input-queued switch stable and achieve high throughput. Furthermore, approaches which eliminate the scheduler in favor of a two-stage load-balancing architecture require a speed-up of the switch and additional mechanisms to re-sequence out-of-order packets, and often do not have good performance with respect to packet delay.

In existing input-queued switches, a scheduler uses a scheduling algorithm which determines matching (e.g., maximum weighted matching problem) between input ports and output ports. As the number of ports and associated line speeds continue to increase, it becomes increasingly difficult to solve the matching problem within required time frames. For example, for lines having line rates of 40 Gbps (OC768) that convey 64-byte packets, a match must be computed every 12.8 nanoseconds. Although approaches to decrease the frequency of matching computations have been proposed (e.g., decreasing frequency of matching by increasing packet size, using the same matching for multiple time frames, or pipelining the matching computation), such approaches fail to keep the input-queued switch stable and achieve high throughput.

SUMMARY OF THE INVENTION

Various deficiencies in the prior art are addressed through the invention of an apparatus and method for switching packets through a switching fabric. The apparatus includes a plurality of input ports for receiving arriving packets, a plurality of output ports for transmitting departing packets, a switching fabric for switching packets from the input ports to the output ports, and a plurality of schedulers controlling switching of packets through the switching fabric. The switching fabric includes a plurality of virtual output queues associated with a respective plurality of input-output port pairs, where each packet received on one of the input ports that is destined for one of the output ports is queued in the virtual output queue associated with the input port and the output port.

One of the schedulers is active during each of a plurality of timeslots. The one of the schedulers active during a current timeslot provides a packet schedule to the switching fabric for switching packets from selected ones of the virtual output queues to associated ones of the output ports during the current timeslot. The packet schedule is computed by the one of the schedulers active during the current timeslot using packet departure information for packets departing from the virtual output queues during previous timeslots during which the one of the schedulers was active and packet arrival information for packets arriving at the virtual output queues during previous timeslots during which the one of the schedulers was active.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides fast switching using a switching fabric and a plurality of schedulers. The schedulers become active in a round-robin manner such that only one of the schedulers is active during any given timeslot. The scheduler active during a given timeslot provides a packet schedule to the switching fabric during that given timeslot. The switching fabric switches packets through the switching fabric during the given timeslot according to the packet schedule received during the given timeslot. A scheduler determines a packet schedule using packet arrival information and packet departure information for packets arriving to and departing from the switch only during timeslots in which that scheduler is the active scheduler (i.e., packets arriving and departing during every $k^{th}$ timeslot where the switch includes k schedulers).

Figure 1:
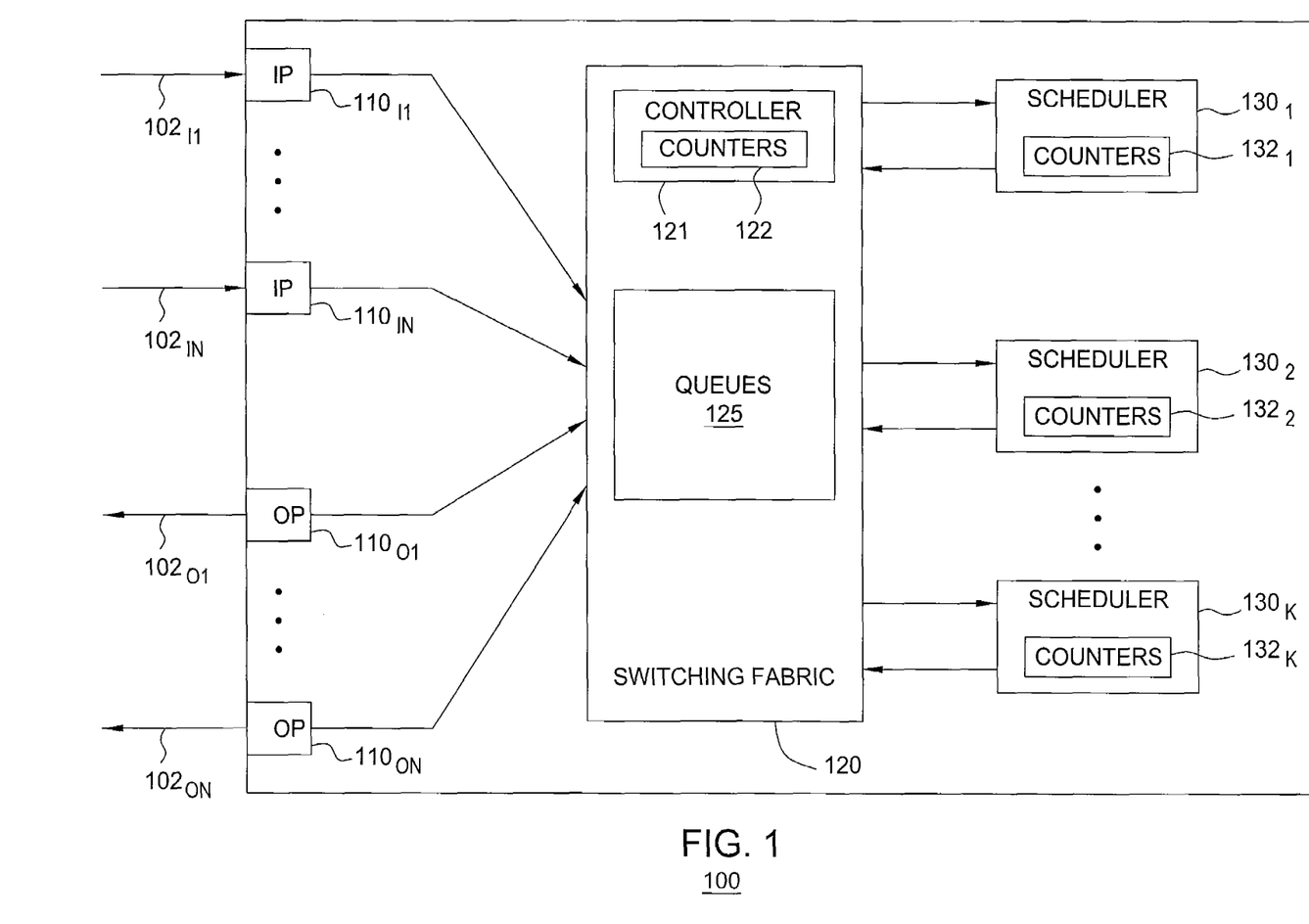
FIG. 1 depicts a high-level block diagram of a switching including a plurality of schedulers.

FIG. 1 depicts a high-level block diagram of a switch. Specifically, switch 100 includes a plurality of input ports (IPs) $110_{I1}$-$110_{IN}$ (collectively, IPs $110_I$) and a plurality of output ports (OPs) $110_{O1}$-$110_{ON}$ (collectively, OPs $110_O$) interconnected via a switching fabric (SF) 120. The IPs $110_{I1}$-$110_{IN}$ receive packets over a plurality of input lines (ILs) $102_{I1}$-$102_{IN}$ (collectively, ILs $102_I$) and provide the packets to SF 120. The OPs $110_{O1}$-$110_{ON}$ receive packets from SF 120 and transmit packets over a plurality of output lines (OLs) $102_{O1}$-$102_{ON}$ (collectively, OLs $102_O$). The SF 120 can connect any of the IPs $110_I$ to any of the OPs $110_O$. The switch 100 includes a plurality of schedulers $130_1$-$130_K$ (collectively, schedulers 130) which control switching of packets through SF 120.

As depicted in FIG. 1, SF 120 includes queues 125 which queue packets at SF 120. The queues 125 include a plurality of virtual output queues (VOQs). The queues 125 include one VOQ for each combination of IP $110_I$ and OP $110_O$. A packet arriving at an input port i whose destination is output port j is queued at $VOQ_{ij}$. In other words, since switch 100 includes N IPs $110_I$ and N OPs $110_O$, queues 125 include $N^2$ VOQs. For purposes of clarity, assume that SF 120 processes fixed length packets, and that time is slotted so that, at most, one packet can arrive at each IP $110_I$ during a given timeslot and one packet can depart from each OP $110_O$ during a given timeslot.

As depicted in FIG. 1, SF 120 includes a controller 121. The controller 121 controls queues 125. The controller 121 controls arrivals of packets at queues 125 and departures of packets from queues 125. The controller 121 includes counters 122. In one embodiment, counters 122 include one counter for each $VOQ_{ij}$. The controller 121 updates counters 122 in response to packet arrivals to SF 120 and packet departures from SF 120. The counters 122 represent current queue lengths of queues 125 (a queue length for each $VOQ_{ij}$). The controller 121 uses packet schedules (computed by schedulers 130 as depicted and described herein) to control switching of packets through queues 125 (i.e., to trigger queues 125 to provide packets to OPs $110_O$ according to packet schedules).

As depicted in FIG. 1, schedulers 130 compute schedules which control switching of packets through queues 125 (i.e., to trigger queues 125 to provide packets to OPs $110_O$ according to packet schedules). In a given timeslot, only one of the schedulers 130 is active. In one embodiment, SF 120 selects one of the schedulers 130 to be active during a given timeslot. In one such embodiment, SF 120 polls schedulers 130 (and the scheduler 130 polled during a given timeslot is that active scheduler for that given timeslot). In one embodiment, schedulers 130 become active in a round-robin manner (e.g., scheduler $130_1$ is active in a first timeslot, scheduler $130_2$ is active in a second timeslot, scheduler $130_K$ is active in a $K^{th}$ timeslot, scheduler $130_1$ is active in a $(K+1)^{th}$ timeslot, and so on).

As depicted in FIG. 1, each scheduler $130_1$-$130_K$ includes a plurality of counters (denoted as counters $132_1$-$132_K$ associated with schedulers $130_1$-$130_N$). In one embodiment, each of the counters $132_1$-$132_K$ includes one counter for each $VOQ_{ij}$ (i.e., counters $132_1$ include $N^2$ counters for the $N^2$ VOQs, counters $132_2$ include $N^2$ counters for the $N^2$ VOQs, and so on). The scheduler $130_i$ active during a given timeslot updates corresponding counters $132_i$ during that given timeslot (i.e., only one set of counters 132 is updated during any given timeslot). The scheduler $130_i$ active during a given timeslot updates corresponding counters $132_i$ using packet departure information specified in a packet schedule provided from scheduler $130_i$ to SF 120 during the given timeslot and packet arrival information received by scheduler $130_i$ from SF 120 during the given timeslot.

As described herein, in a given timeslot, SF 120 processes arriving packets, a scheduler $130_i$ active during the given timeslot provides a packet schedule to SF 120, SF 120 processes the packet schedule from active scheduler $130_i$ to transfer packets from SF 120 to OPs $110_O$ according to the packet schedule, SF 120 provides packet arrival information to active scheduler $130_i$, and active scheduler $130_i$ begins computing the next packet schedule which will be provided from scheduler 130 to SF 120 during the next timeslot in which scheduler $130_i$ is active. In other words, since K timeslots pass before scheduler $130_i$ becomes active again, scheduler $130_i$ has K timeslots during which to compute the next packet schedule. The operation of SF 120 and schedulers 130 may be better understood with respect to FIG. 2 and FIG. 3.

Figure 2:
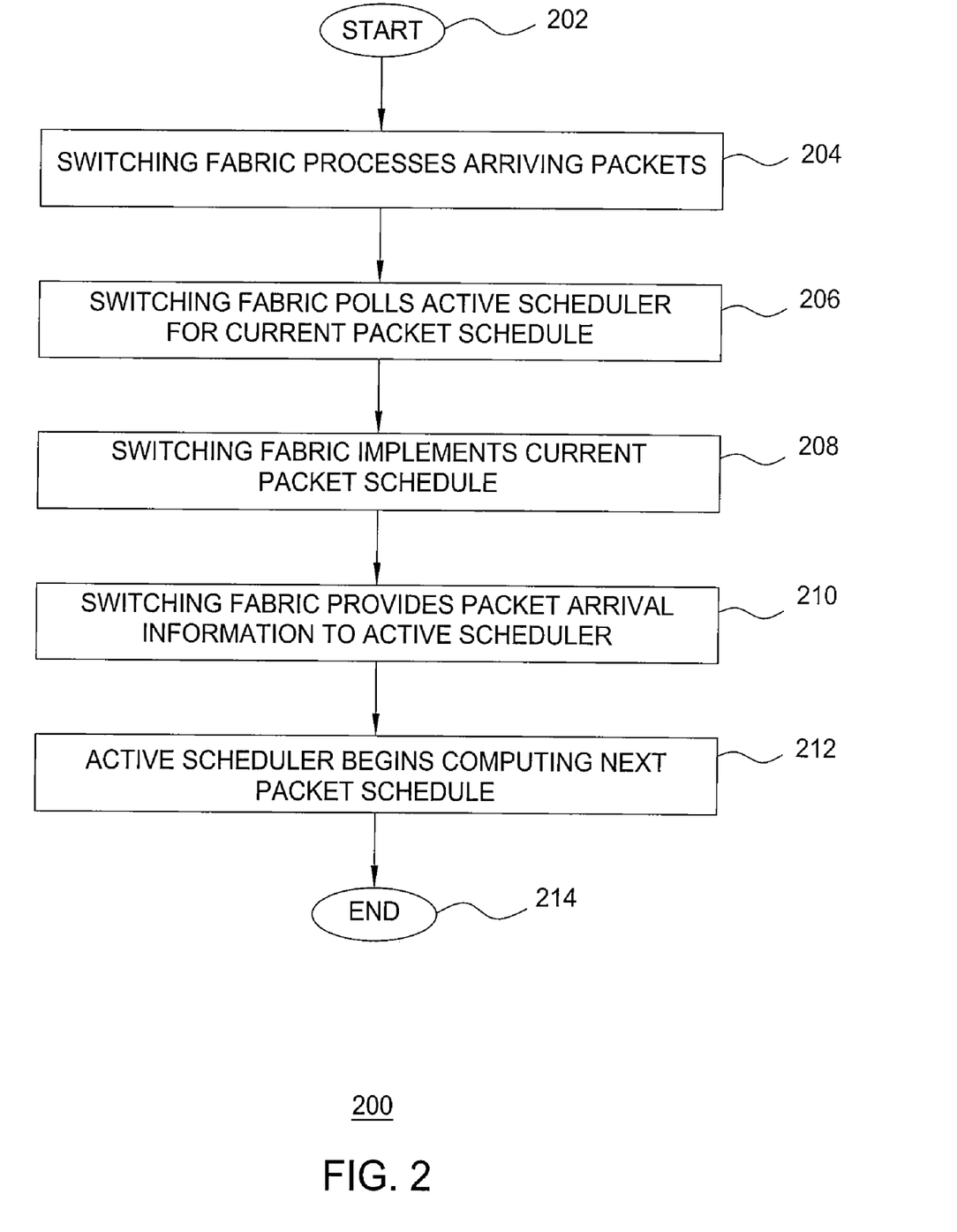
FIG. 2 depicts a method according to one embodiment of the present invention.

FIG. 2 depicts a method according to one embodiment of the present invention. Specifically, method 200 of FIG. 2 includes a method for switching packets through a switching fabric according to a packet schedule computed by a scheduler. The method 200 describes steps performed during one timeslot in which one of K schedulers is active where the current packet schedule was computed by that one of the K schedulers during the previous K timeslots (i.e., during the time since that scheduler was last active). Although depicted and described as being performed serially, at least a portion of the steps of method 200 may be performed contemporaneously, or in a different order than depicted in FIG. 2. The method 200 begins at step 202 and proceeds to step 204.

At step 204, the switching fabric processes arriving packets. The switch receives packets at input ports. The input ports direct the packets to the switching fabric. The switching fabric queues the received packets. At step 206, the switching fabric polls the active scheduler (i.e., one of the K schedulers in the switch) for the current packet schedule. The current packet schedule is the packet schedule computed by the active scheduler over the previous K timeslots (i.e., during the time since that scheduler was last active). The current packet schedule identifies which queued packets should be removed from the queues and switched through the switching fabric to associated output ports.

At step 208, the switching fabric implements the current packet schedule. The switching fabric removes identified packets from the queues and switches the identified packets through the switching fabric to associated output ports from which the packets are transmitted over associated output lines. At step 210, the switching fabric provides packet arrival information to the active scheduler. The packet arrival information identifies packets received and queued during the current timeslot. The packet arrival information identifies input-output port pairs for which a packet was received and queued during the current timeslot.

At step 212, the active scheduler begins computing the next packet schedule. The active scheduler computes the next packet schedule using the packet arrival information (identifying packets received at the switching fabric and queued in the switching fabric queues during the current timeslot) and the current packet schedule (also denoted herein as packet departure information identifying packets removed from the switching fabric queues and switched through the switching fabric to associated output ports during the current timeslot). In other words, each scheduler computes a packet schedule using only packet arrival and departure information for packets arriving and departing the timeslot in which that scheduler is active. At step 214, method 200 ends.

Although omitted for purposes of clarity, method 200 is repeated during each timeslot using a different one of the schedulers of the switch. In one embodiment, the schedulers of the switch become active in a round-robin manner such that, for a switch having K schedulers, each scheduler is active once every K timeslots. As depicted in FIG. 2, during the current timeslot the scheduler active during that timeslot begins computing the next packet schedule which will be implemented by the switch fabric during the next timeslot in which that scheduler is active. In other words, for a switch having K schedulers, each scheduler has K timeslots during which to compute the next packet schedule which will be implemented by the switch fabric during the next timeslot in which that scheduler is active. The steps of method 200 may be better understood with respect to FIG. 3.

Figure 3:
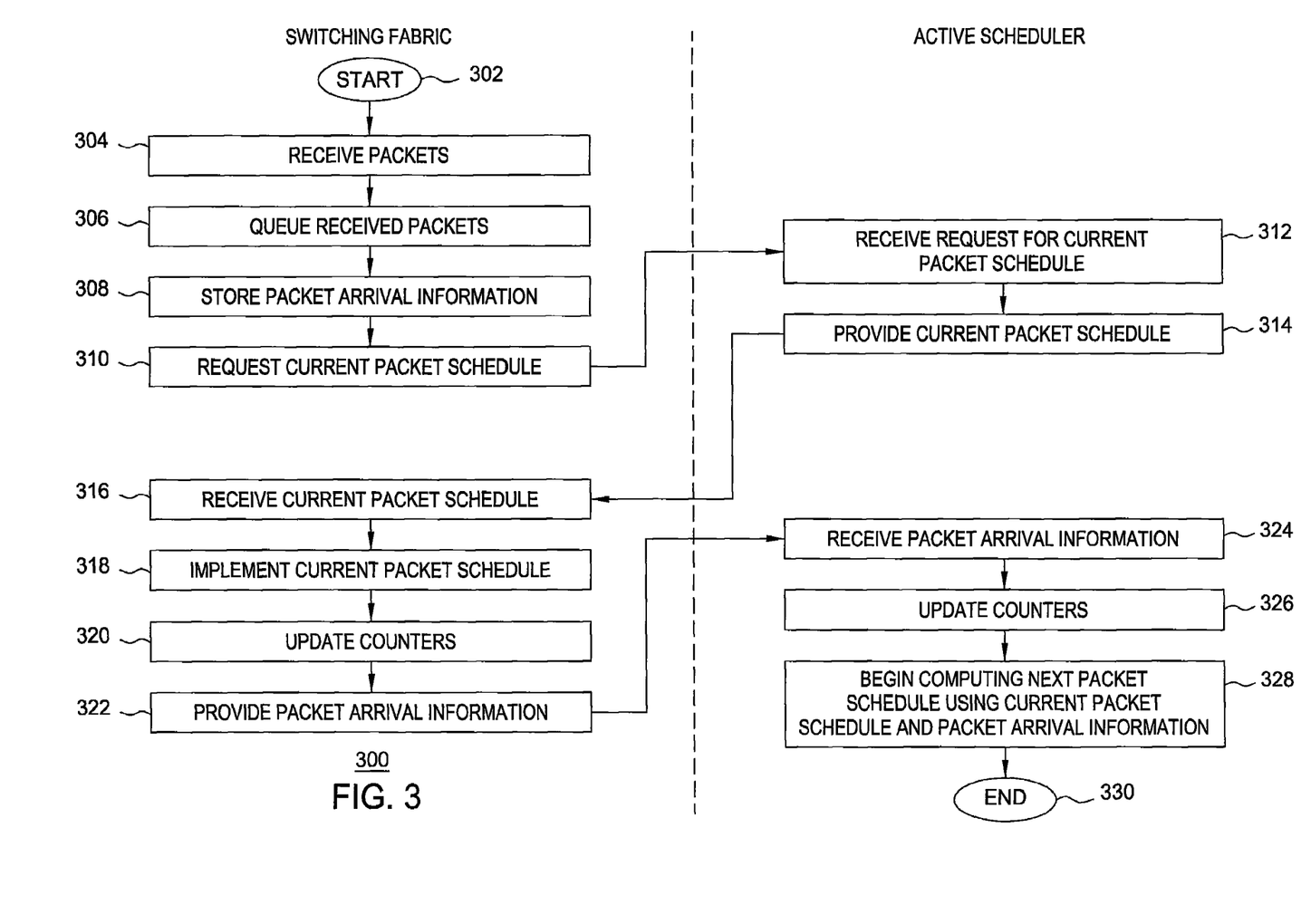
FIG. 3 depicts a method according to one embodiment of the present invention.

FIG. 3 depicts a method according to one embodiment of the present invention. Specifically, method 300 of FIG. 3 includes a method for switching packets through a switching fabric according to a packet schedule computed by a scheduler. The method 300 describes steps performed during one timeslot in which one of K schedulers is active where the current packet schedule was computed by that one of the K schedulers during the previous K timeslots (i.e., during the time since that scheduler was last active). Although depicted and described as being performed serially, at least a portion of the steps of method 300 may be performed contemporaneously, or in a different order than depicted in FIG. 3. The method 300 begins at step 302 and proceeds to step 304.

At step 304, the switching fabric receives packets. The switch receives packets at input ports which direct the packets to the switching fabric. At step 306, the switching fabric queues the received packets. The switching fabric includes virtual output queues (VOQs), one VOQ for each combination of IP $110_I$ and OP $110_O$. A packet arriving at an input port i whose destination is output port j is queued at $VOQ_{ij}$. For purposes of clarity, the current timeslot is denoted as time t (i.e., packets received and queued during the current timeslot are denoted as packets received and queued at time t). At step 308, the switching fabric stores packet arrival information for packets received and queued at the switching fabric during the current timeslot.

In one embodiment, packet arrival information for the current timeslot is represented using an N×N binary matrix A(t) which represents packet arrivals at time t. The N×N binary matrix A(t) includes $N^2$ values (one value associated with each $VOQ_{ij}$ of the switching fabric) where $A_{ij}(t)=1$ if a packet arrives at input port i with an associated destination of output port j. Since there can be, at most, one packet received at each input port in a given timeslot, $\Sigma_j A_{ij}(t) \leq 1$. In one embodiment, packet arrival information may be represented using an N-sized vector. In this embodiment, the N-sized vector may be denoted as $\alpha$ where $\alpha_i(t)=j$ if, at time t, a packet destined for output port j arrives at input port i and $\alpha_i(t)=0$ if no packet arrives at input port i at time t.

At step 310, the switching fabric requests the current packet schedule from the active scheduler. In one embodiment, the switching fabric polls the active scheduler for the current packet schedule. At step 312, the active scheduler receives the request for the current packet schedule. At step 314, the active scheduler provides the current packet schedule to the switching fabric. The current packet schedule identifies which queued packets should be removed from the queues and switched through the switching fabric to associated output ports. At step 316, the switching fabric receives the current packet schedule. At step 318, the switching fabric implements the current packet schedule. The switching fabric removes identified packets from the queues and switches the identified packets through the switching fabric to associated output ports.

In one embodiment, the current packet schedule is represented using a binary switching matrix S(t) which identifies matches to be implemented at the switching fabric during current timeslot t. The binary switching matrix S(t) is an N×N matrix including $N^2$ values (one value associated with each $VOQ_{ij}$ of the switching fabric). If $S_{ij}(t)=1$, a packet at the head of $VOQ_{ij}$ is removed from $VOQ_{ij}$ and transmitted through the switching fabric to output port j. If $S_{ij}(t)=0$, no packet is removed from $VOQ_{ij}$. Since there can be, at most, one packet transmitted from each output port in a given timeslot (and one packet received at each input port in a given timeslot), $\Sigma_i S_{ij}(t) \leq 1$ and $\Sigma_j S_{ij}(t) \leq 1$. If $S_{ij}(t)=1$ and $VOQ_{ij}$ is empty the match is wasted since there is no packet available to be switched through the switching fabric.

At step 320, the switching fabric updates counters associated with respective queues $VOQ_{ij}$. The switching fabric counters associated with respective queues $VOQ_{ij}$ represent queue lengths of respective queues $VOQ_{ij}$. In one embodiment, queue lengths of respective queues $VOQ_{ij}$ are represented using an N×N binary matrix $Q_{ij}(t)$. The queue lengths $Q_{ij}(t)$ of respective queues $VOQ_{ij}$ represent queue lengths after the switching fabric accepts packet arrivals during timeslot t and processes the current packet schedule by which packets depart the switching fabric during timeslot t. The queue lengths $Q_{ij}(t)$ of respective queues $VOQ_{ij}$ are updated during the current timeslot t as follows:

$$Q_{ij}(t) = \begin{cases} Q_{ij}(t-1) + 1 & \text{if } \alpha_i(t) = j, S_{ij}(t) = 0 \\ (Q_{ij}(t-1) - 1)^+ & \text{if } \alpha_i(t) \neq j, S_{ij}(t) = 1 \\ Q_{ij}(t-1) & \text{otherwise} \end{cases} \quad \text{Eq. 1}$$

where $(\alpha)^+ = \max\{\alpha, 0\}$

At step 322, the switching fabric provides packet arrival information to the active scheduler. The switching fabric provides packet arrival information for packets received and queued at the switching fabric during the current timeslot. In other words, arriving packets are virtually partitioned between the different schedulers such that each arriving packet may be thought of as being associated with the one scheduler that is active during the timeslot in which that packet arrives at the switch. Although a packet queued in a VOQ may be associated with a particular scheduler based on which scheduler was active during the timeslot in which that packet arrived, that packet may be selected for transmission (as specified in a packet schedule) by any of the schedulers.

The switching fabric may provide packet arrival information to an active scheduler using one or more formats. In one embodiment, the switching fabric provides the packet arrival information to the active scheduler using an arrival matrix (e.g., using an arrival matrix denoted as A(t)). In one embodiment, the switching fabric provides the packet arrival information to the active scheduler using an arrival vector (e.g., using an arrival vector denoted as $\alpha(t)$). In one such embodiment, arrival vector α(t) uses O(N log N) bits. The switching fabric does not provide the current queue lengths of queues $VOQ_{ij}$ as the packet arrival information. The actual packets are not provided to the active scheduler.

At step 324, the active scheduler receives the packet arrival information from the switching fabric. As described herein, each scheduler maintains $N^2$ counters corresponding to the $N^2$ VOQs of the switching fabric. The value of the counter (i,j) at scheduler k which corresponds to $VOQ_{ij}$ at the switching fabric at timeslot t is denoted as $n^k_{ij}(t)$. The value $n^k_{ij}(t)$ estimates the number of packets remaining in $VOQ_{ij}$ that are associated with scheduler k (i.e., the packets that arrived at $VOQ_{ij}$ during one of the previous timeslots in which scheduler k was the active scheduler). Since each scheduler is active only once every K timeslots, the values of counters $n^k_{ij}(t)$ change only once every K timeslots and do not represent the current state (i.e., current queue lengths) of respective queues $VOQ_{ij}$.

At step 326, the active scheduler updates counters associated with respective queues $VOQ_{ij}$. Since the active scheduler is only active once every K timeslots, the active scheduler counters associated with respective queues $VOQ_{ij}$ do not represent queue lengths of respective switching fabric queues $VOQ_{ij}$. In one embodiment, the active scheduler counters $n^k_{ij}(t)$ associated with respective switching fabric queues $VOQ_{ij}$ are represented using an N×N binary matrix. The counters $n^k_{ij}(t)$ associated with respective queues $VOQ_{ij}$ are updated using the packet departure information (i.e., the current packet schedule sent from the active scheduler to the switching fabric) and the packet arrival information received from the switching fabric. The counters $n^k_{ij}(t)$ associated with respective queues $VOQ_{ij}$ are updated during the current timeslot t as follows:

$$n^k_{ij}(t) = \begin{cases} n^k_{ij}(t-K) + 1 & \text{if } \alpha_i(t) = j, S_{ij}(t) = 0 \\ (n^k_{ij}(t-K) - 1)^+ & \text{if } \alpha_i(t) \neq j, S_{ij}(t) = 1 \\ n^k_{ij}(t-K) & \text{otherwise} \end{cases} \quad \text{Eq. 2}$$

At step 326, the active scheduler begins computing the next packet schedule. The active scheduler k computes the next packet schedule using counters $n^k_{ij}(t)$ associated with respective switching fabric queues $VOQ_{ij}$, including the packet departure information (i.e., the current packet schedule) and the packet arrival information. Since each scheduler is active once each K timeslots, each scheduler has K timeslots during which to compute the next packet schedule. The next packet schedule is used as the current packet schedule during the next timeslot in which that scheduler is active (i.e., the next packet schedule that is computed during timeslots t through (t+(K−1)) is used to switch packets through the switching fabric during the next timeslot in which that scheduler is active, i.e., during timeslot (t+K)). At step 328, method 300 ends.

As described herein, a scheduler may compute a packet schedule using one or more algorithms. In one embodiment, a scheduler may compute a packet schedule using a maximum weighted matching algorithm. In one such embodiment, scheduler k computes a packet schedule by computing a maximum weighted matching on an N×N bipartite graph (i.e., using counters $n^k_{ij}(t)$ associated with respective switching fabric queues $VOQ_{ij}$). The active scheduler k may use one of many different algorithms for computing the maximum weighted matching on the N×N bipartite graph. The maximum weighted matching algorithms compute maximum weighted matching to guarantee stability and provide good delay performance.

In one embodiment, the maximum weighted matching algorithm is a variant of the shortest augmenting path algorithm (e.g., a flow augmentation algorithm). In one embodiment, the maximum weighted matching algorithm is a primal-dual-based auction algorithm. The auction algorithm has several advantages over the flow augmentation algorithm. The auction algorithm is simple to implement in hardware and, unlike the flow augmentation algorithm, the auction algorithm is easy to parallelize. Furthermore, memory of the last match may be built into the auction algorithm using dual prices, thereby reducing the number of iterations required to compute the maximum weighted matching.

The maximum weighted matching algorithms compute maximum weighted matches to guarantee stability of the switch and provide good delay performance for packets traversing the switch. With respect to stability of the scheduling algorithm, consider each arrival to the switching fabric as being virtually assigned to one of the schedulers (since only one scheduler is active during each timeslot). In order to show the stability of the scheduling algorithm, let $\lambda_{ij}$ denote the arrival rate at $VOQ_{ij}$, where arrival rate $\lambda_{ij}$ is computed according to Equation 3. In order for the switch to be stable, arrival rates $\lambda_{ij}$ must satisfy conditions of Equation 4.

$$\lambda_{ij} = \lim_{t \to \infty} \frac{\sum_t A_{ij}(t)}{t} \quad \text{Eq. 3}$$

$$\sum_i \lambda_{ij} \leq 1, \sum_j \lambda_{ij} \leq 1 \quad \text{Eq. 4}$$

A set of arrival rates $\lambda_{ij}$ satisfying the conditions of Equation 4 is termed admissible. Assuming, for purposes of clarity, that packet arrivals at the switching fabric form an independent, identically distributed Bernoulli process, the probability that a given packet arriving at port i will have a destination of port j is $\lambda_{ij}$ independent of all other packet arrivals and departures. The queues $VOQ_{ij}$ at the switching fabric are defined to be stable if there exists a constant B such that $Q_{ij}(t) \leq B$, for all combinations of (i,j), for all timeslots t. If the switch is stable the queue lengths are bounded and, therefore, the switch can achieve 100% throughput (i.e., the terms stable and 100% throughput may be used interchangeably). The maximum weighted matching algorithm that selects a matching S*(t) at timeslot t that maximizes $\Sigma_i \Sigma_j (S_{ij}(t) Q_{ij}(t))$ guarantees 100% throughput for any admissible arrival rate matrix.

As described herein, $Q_{ij}(t)$ is the number of packets in $VOQ_{ij}$ at timeslot t and $n^k_{ij}(t)$ is the counter value at scheduler k for port pair (i,j) at timeslot t. When a packet enters $VOQ_{ij}$, the value of counter $n^k_{ij}(t)$ is incremented by one at the active scheduler k. If the active scheduler k specifies a match between input port i and output port j, the value of counter $n^k_{ij}(t)$ is decremented by one if $n^k_{ij}(t) > 0$. If there is a packet in $VOQ_{ij}$, that packet (or the packet at the head of the queue if there are multiple packets in $VOQ_{ij}$) is switched through the switching fabric and transmitted out of the switch via output port j. Since there is not a requirement that active scheduler k may only specify a match when $n^k_{ij}(t) > 0$, active scheduler k may specify matches when $n^k_{ij}(t)=0$. Based on this, Equation 5 and Equation 6 hold, as follows:

$$Q_{ij}(t) = \sum_{k=1}^{K} n^k_{ij}(t) \quad \text{if matches are made only if } n^k_{ij}(t) > 0 \qquad \text{Eq. 5}$$

$$Q_{ij}(t) \le \sum_{k=1}^{K} n^k_{ij}(t) \quad \text{if matches are made when } n^k_{ij}(t) \ge 0 \qquad \text{Eq. 6}$$

Based on Equation 5 and Equation 6, the switching fabric queues are stable if the counters at all of the schedulers are stable. Thus, in order to maintain the stability of the switch, the schedulers must ensure that the counters at the schedulers are stable. Since only one scheduler is active during each timeslot, each packet arriving at the switching fabric may be considered to be virtually assigned to the scheduler active during the timeslot in which the packet arrives. Letting $\beta^k_{ij}$ be the fraction of packet arrivals associated with port pair (i,j) that are virtually assigned to scheduler k, since arrivals to the switch are independent identically distributed Bernoulli and schedulers become active in a round-robin manner, Equation 7 holds, as follows:

$$\beta^k_{ij} = \frac{\lambda_{ij}}{K} \qquad \text{Eq. 7}$$

The condition of Equation 7 formally states that, in the long term, packet arrivals are uniformly spread across the different schedulers (in the sense that they are spread over the different timeslots in which the different schedulers are active). Based on Equation 7, the admissibility condition for each of the schedulers is $\Sigma_j \beta^k_{ij} < 1/K$ and $\Sigma_i \beta^k_{ij} < 1/K$, where the factor $1/K$ is due to the fact that each scheduler k is active only once every K timeslot and, thus, the effective service rate is only $1/K$. The admissibility of an arrival rate matrix $\lambda$ for the switch implies that $\beta^k_{ij}$ is admissible for scheduler k. Based on such results, letting k denote the active scheduler during timeslot t, if scheduler k computes a matching $S^*(t)$ that maximizes Equation 8, then counters $n^k_{ij}(t)$ at the schedulers are bounded.

$$\sum_i \sum_j S_{ij}(t) n^k_{ij}(t-K) \qquad \text{Eq. 8}$$

Based on Equation 8, since each scheduler is active only once every K timeslots, each scheduler has K timeslots during which that scheduler may compute a packet schedule (i.e., the present invention may be viewed as slowing the clock at the scheduler by a factor of K). Although the current packet schedule implemented during the current timeslot in which scheduler k is active was computed using counter matrix $n^k_{ij}(t-K)$ from the previous timeslot in which scheduler k was active, since there can be a maximum of one arrival per input and one departure per output during the time from the previous timeslot in which scheduler k was active to the current timeslot in which scheduler k is active, use of counter matrix $n^k_{ij}(t-K)$ from the previous timeslot in which scheduler k was active for computing the current packet schedule implemented during the current timeslot is not an issue.

As described herein, an active schedule computes a packet schedule by computing a maximum weighted matching using a maximum weighted matching algorithm. In one embodiment, the active scheduler k may use the values of the counters $n^k_{ij}(t)$ as the weights of the matching for generating the packet schedule. If active schedulers use respective counters $n_{ij}(t)$ as weights for the maximum weighted matching problem, queues VOQ at the switching fabric remain stable; however, there is no guarantee with respect to delay performance of the switch. Specifically, using the values of the counters $n^k_{ij}(t)$ as the weights of the matching provides good delay performance for uniform traffic, however, using the values of the counters $n^k_{ij}(t)$ as the weights of the matching does not provide good delay performance for non-uniform traffic. For non-uniform traffic, average packet delay increases rapidly as the number of schedulers increases.

In one embodiment, in order to improve delay performance, rather than using the values of the counters $n^k_{ij}(t)$ as the weights in the maximum weighted matching problem, changes may be made to the weights used in the maximum weighted matching problem. In one embodiment, in order to maintain the stability of the switching fabric queues while providing good delay performance for both uniform and non-uniform traffic, memory may be built into the edges at the schedulers, as described herein below. In one embodiment, in order to maintain the stability of the switching fabric queues while providing good delay performance for both uniform and non-uniform traffic, the size of the matching may be increased, as described herein below.

In one embodiment, in order to maintain the stability of the switching fabric queues while providing good delay performance for both uniform and non-uniform traffic, memory may be built into the edges at the schedulers. As described herein, since in each timeslot there is at most one arrival per input port and one departure per output port, the maximum weight match cannot change drastically over consecutive timeslots. Therefore, in each timeslot the weight of an edge may only change by a maximum of one. In some existing algorithms the scheduler remembers matches from the previous timeslot, where either the same match is repeated for many timeslots or the match from the previous timeslot is modified for use in the current timeslot. In such algorithms it is often better to remember "good" edges from the previous timeslots than remembering the whole match from the previous timeslots.

For the present invention, since the packet arrival information is partitioned among the K schedulers, none of the schedulers have a complete picture of the packet arrival process; however, all of the schedulers undergo the same stochastic evolution. Thus, if there is a persistent queue for a given port pair (i,j) at a scheduler it is likely that there are other schedulers with persistent queues for that given port pair (i,j), and if there is a port pair (i,j) with an associated queue $VOQ_{ij}$ which became empty during the current timeslot it is more likely that there are other schedulers that have an occupied queue for port pair (i,j) than an empty queue for port pair (i,j). This observation is especially true where the traffic is non-uniform and some port pairs are heavily loaded.

Based on such observations, when computing a maximum weighted match at a scheduler, among all edges the edges (i,j) with counters $n^k_{ij}(t)>0$ will be preferred to edges (i,j) with counters $n^k_{ij}(t)=0$ and, among edges (i,j) with counters $n^k_{ij}(t)=0$ edges (i,j) with counters $n^k_{ij}(t)>0$ in the recent past will be preferred to edges (i,j) with counters $n^k_{ij}(t)=0$ in the recent past. An edge (i,j) will be denoted as an active edge at timeslot t if $n^k_{ij}(t)>0$. The set of active edges at scheduler k at timeslot t will be denoted as $A_k(t)$. An edge (i,j) will be denoted as an inactive edge at timeslot t if $n^k_{ij}(t)=0$. The set of inactive edges at scheduler k at timeslot t will be denoted as $I_k(t)$.

An edge (i,j) will be denoted as a zombie edge at timeslot t if: (1) that edge (i,j) became inactive during one of the last s timeslots during which scheduler k was active, and (2) that edge (i,j) has not become active since that time. The set of zombie edges at scheduler k at timeslot t will be denoted as $Z_k(t)$. The integer s is denoted as the persistence factor. Although persistence factor s can be different for different edges, for purposes of clarity an assumption is made that persistence factor s is common for all edges associated with scheduler k. The persistence factor s is local to scheduler k. In other words, once an edge becomes inactive that edge will be a zombie edge for the next s timeslots during which scheduler k is active. In one embodiment, the chances of using zombie edges in a match rather than using inactive edges in a match may be improved by manipulating the edge weights.

In one embodiment, edge weights may be manipulated by inflating the edge weights. In one such embodiment, a non-negative constant b (denoted as the weight inflation factor) may be added to each non-zero edge weight. The weight inflation factor b increases the size of the matching while ensuring that the weight of the match is also high. Although maximum size matching improves instantaneous switch throughput, using maximum size matching during each timeslot does not guarantee switch stability. By contrast, maximum size—maximum weight matching, which uses the maximum weight among the matches with the largest number of edges, provides good delay performance. Since the weight of edge (i,j) at scheduler k during timeslot t to guarantee stability is $w_{ij}(t)=n^k_{ij}(t-K)$, the edge weights may be modified using the weight inflation factor as shown in Equation 9, which follows:

$$w_{ij}(t) = \begin{cases} n^k_{ij}(t-K) + b & \text{if } n^k_{ij}(t-K) > 0 \\ 0 & \text{if } n^k_{ij}(t-K) = 0 \end{cases} \qquad \text{Eq. 9}$$

In this embodiment, active scheduler k computes a packet schedule by computing a maximum weighted matching using inflated edge weights (e.g., edge weights inflated as shown in Equation 9). Letting f(m) represent the maximum weight match (without weight inflation) with m edges, then solving the maximum weight matching with inflated edge weights is to solve Equation 10. In Equation 10, if weight inflation factor b=0 then the problem is a standard maximum weight matching problem and if weight inflation factor b=∞ then the problem is a maximum size matching problem. Therefore, weight inflation factor b represents the compromise between achieving switch stability and increasing instantaneous switch throughput.

$$\max_{1 \le m \le N} f(m) + mb \qquad \text{Eq. 10}$$

Figure 4:
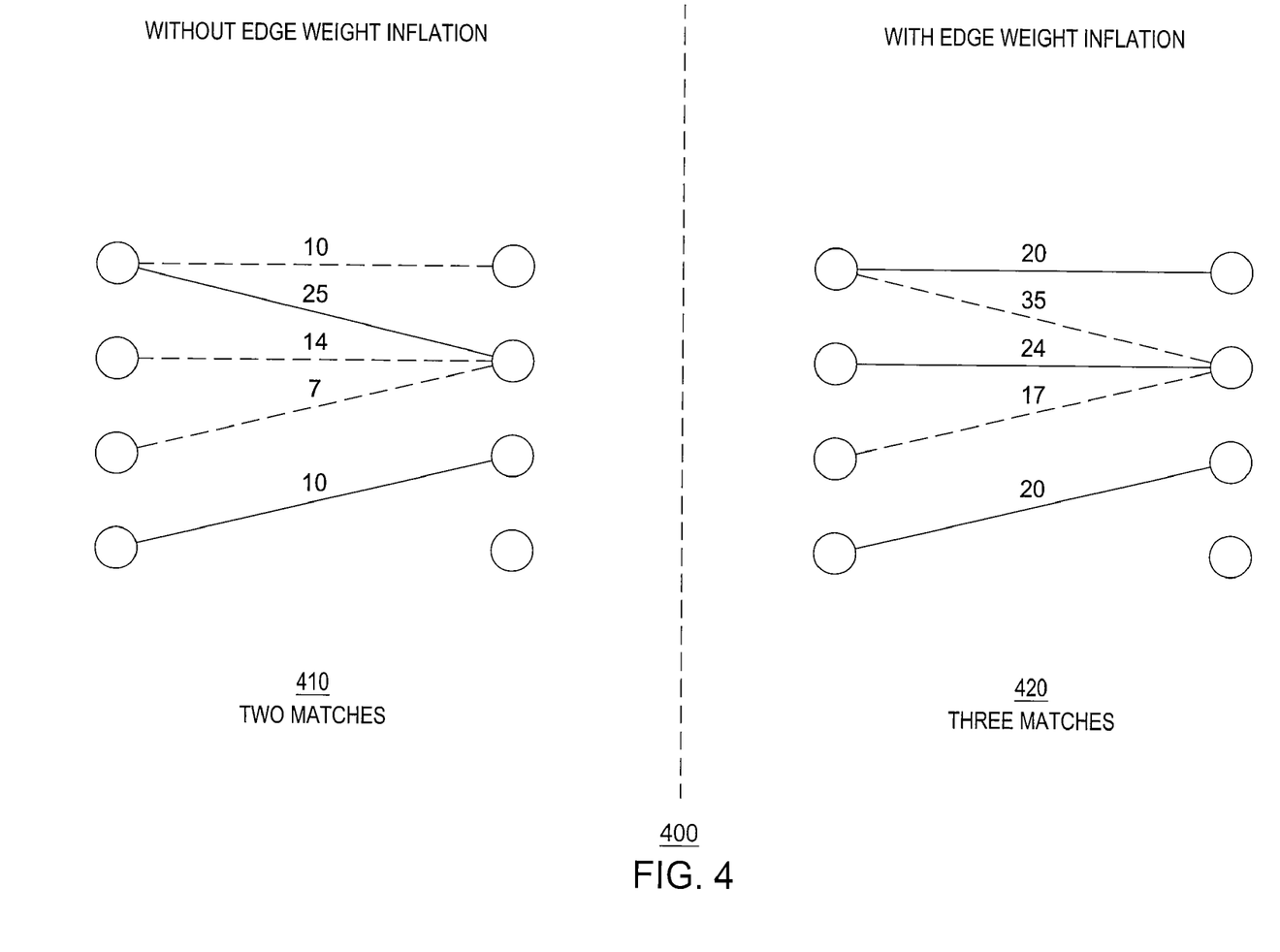
FIG. 4 depicts maximum weighted matching graphs without inflated edges and with inflated edges.

As described herein, using inflated edge weights to compute maximum weighted matching increases the number of matches identified and specified in the packet schedule (and, therefore, increases the number of packets switched through the switching fabric in each timeslot according to the associated packet schedule), thereby improving packet delay performance. FIG. 4 depicts a comparison of maximum weighted matching without inflated edges (shown in a graph 410 on the left) and maximum weighted matching with inflated edges (shown in a graph 420 on the right), clearly showing the advantage of using inflated edge weights in solving maximum weighted matching problems.

As depicted in FIG. 4, graph 410 depicting maximum weighted matching without inflated edges (the graph on the left) includes five possible edges. The numbers next to the edges represent the weights of the respective edges. The edges (from top to bottom) have weights of 10, 25, 14, 7, and 10, respectively. The maximum weight matching in graph 410 includes two edges (denoted using solid lines); one with a weight of 25 and another with a weight of 10, giving a maximum weight matching of 35. In order to demonstrate the advantage of using inflated edge weights, the edge weights in the graph depicting maximum weighted matching without inflated edges (graph 410 on the left) are each increased by 10, resulting in the graph depicting maximum weighted matching with inflated edges (graph 420 on the right).

As depicted in FIG. 4, graph 420 depicting maximum weight matching with inflated edges (the graph on the right) includes five possible edges (the same five edges depicted in graph 410). The numbers next to the edges represent the inflated weights of the respective edges. The edges (from top to bottom) have weights of 20, 35, 24, 17, and 20, respectively. The maximum weight matching in graph 420 includes three edges (denoted using solid lines) having weights of 20, 24, and 20, respectively. In terms of inflated edge weights of the three edges, the maximum weight matching in graph 420 is 64; however, in terms of original edge weights of the three edges the maximum weight matching in graph 420 is 34. Therefore, by inflating edge weights from graph 410 to graph 420, the resulting maximum weight matching includes an extra edge (three matches versus two) with a slight decrease in the maximum edge weight (from 35 to 34), thereby improving packet delay performance.

Furthermore, in addition to increasing the size of the match in the maximum weight matching, edge weight inflation provides a means by which zombie edges may be incorporated into the maximum weight matching. As described herein, for maximum weight matching zombie edges are preferred over other inactive edges. In one embodiment, this preference for zombie edges over other inactive edges may be implemented by inflating the edge weights of active edges and zombie edges by a weight inflation factor b while edge weights of other inactive edges are set to zero, as depicted in Equation 11, which follows:

$$w_{ij}(t) = \begin{cases} n^k_{ij}(t-K) + b & \text{if } (i,j) \in A_k(t) \\ b & \text{if } (i,j) \in Z_k(t) \\ 0 & \text{otherwise} \end{cases} \qquad \text{Eq. 11}$$

As described herein, although modified edge weights were primarily applied to improve packet delay performance, stability results may be extended for embodiments using modified edge weights. Specifically, with respect to switch stability, instead of solving the maximum weight matching problem using counter values $n^k_{ij}$ of scheduler k as edge weights, it is sufficient to use any other edge weight which results in a match that is bounded away from the maximum weight match. If a scheduling algorithm B is used, letting $W^B(t)$ denote the weight of the schedule used at timeslot t and $W^*(t)$ denote the weight of maximum weight matching on a queue process resulting when scheduling algorithm B is used, if there exists a positive constant c such that $W^B(t) \ge W^*(t)-c$ for all timeslots t then scheduling algorithm B is stable. Therefore, a scheduling algorithm with modified weights is stable.

In one embodiment, the maximum weighted matching algorithm is a primal-dual-based auction algorithm that iteratively matches input ports to output ports. Initially, all input ports and all output ports are unassigned, and each output port has an associated price $p_j$ that is initialized to zero. Using the auction algorithm, assume that edge (i,j) has weight $w_{ij}$. The value of output j to input i is $w_{ij}-p_j$. The auction algorithm involves cycling through two phases: a bidding phase and an assignment phase. In the bidding phase, input ports bid on output ports (or a controller simulates bids made by input ports for output ports. In the assignment phase, output ports are assigned to input ports based on the bidding phase.

In the bidding phase of the auction algorithm, for each input port i that is not assigned to an output port j, a highest value output port (denoted as B(i)) is determined as $$B(i) = \arg\max_j (w_{ij} - p_j),$$

a value of the best object is determined as $f_i = w_{iB(i)} - p_{B(i)}$, and a value of the second best object is determined as $s_i$. The auction algorithm then operates such that each input port i places a bid on an output port B(i). The amount of the bid of an input port i on output port B(i) is $p_{B(i)} + f_i - s_i + \epsilon$. Using the auction algorithm, each input port i bids on exactly one output port, while each output port can receive bids from multiple input ports (since multiple input ports may be vying for the same output port).

In the assignment phase of the auction algorithm, each output port j having at least one associated bid from an input port i selects the input port P(j) associated with the highest bid. In other words, for each output port j, the selected input port $$P(j) = \arg\max_{i:B(i)=j} (p_j + f_i - s_i + \varepsilon).$$

If the output port j is currently assigned to another input port (during a previous iteration of the bidding phase and assignment phase), that output port j is unassigned from that input port and re-assigned to input port P(j) instead, and, furthermore, the price of output port j is updated as $p_j \leftarrow p_j + f_{P(j)} - s_{P(j)} + \epsilon$.

The scheduler performing the auction algorithm iteratively repeats the bidding phase and the assignment phase until all input ports have been assigned to a corresponding output port, thereby specifying the packet schedule which that scheduler provides to the switching fabric during the next timeslot in which that scheduler becomes the active scheduler. In the auction algorithm, an accuracy parameter $\epsilon$ determines accuracy of the optimal solution. A larger value of $\epsilon$ implies that the solution is less accurate. In order to obtain an optimal solution accuracy parameter $\epsilon$ must be set to a value less than 1/N, where N is the number of ports in the switch.

In the auction algorithm, once an output port is matched it remains matched until termination (although, as described herein, the input port to which an output port is matched may change in different iterations of the auction algorithm). Using the auction algorithm, whenever an output port receives a bid the price of the output port increases by at least $\epsilon$ such that, if $\epsilon < 1/N$ all data is integral, the auction algorithm terminates with the maximum weight matching. In one embodiment, to avoid real-number computations, the costs may be scaled and the accuracy parameter $\epsilon$ may be set equal to one ($\epsilon=1$).

In the auction algorithm, the number of iterations is pseudo-polynomial; however, for most maximum weight matching problems the auction algorithm works extremely fast. In such embodiments, the delay results are practically unaffected regardless of whether the auction algorithm is solved to optimality or terminated after a predetermined number of iterations (e.g., after 100 iterations). In most cases, the auction algorithm reaches the optimal solution within 100 iterations; however, if the auction algorithm does not reach the optimal solution within 100 iterations (or some other predetermined number of iterations), only a partial match is identified. In one embodiment, a greedy algorithm may be used on the partial match in order to complete the match (and thereby obtain the packet schedule for that scheduler). In one such embodiment, the greedy algorithm may include, for each unassigned output port, selecting an unassigned input port i to assign to an unassigned output port j having the highest $w_{ij}$ value.

Figure 5:
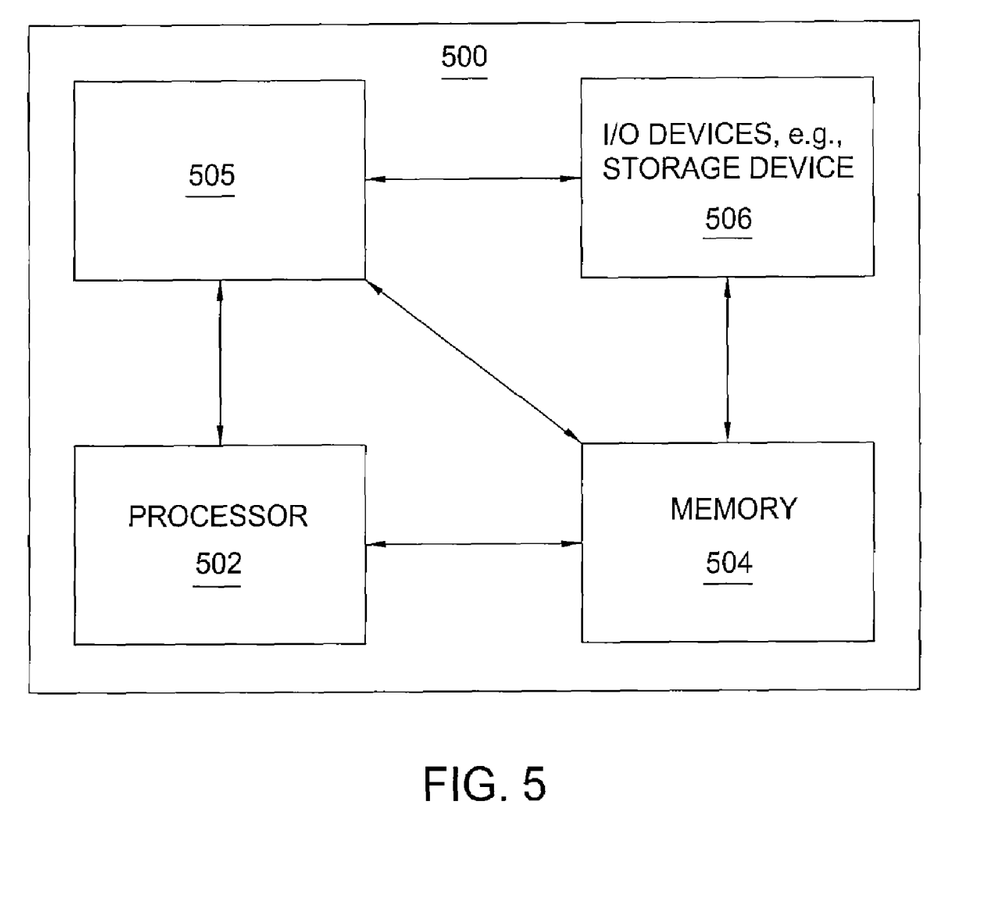
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a packet scheduling module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present MTU size process 505 can be loaded into memory 504 and executed by processor 502 to implement the functions as discussed above. As such, MTU size process 505 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a plurality of input ports for receiving arriving packets;
   a plurality of output ports for transmitting departing packets;

a switching fabric for switching packets from the input ports to the output ports, the switching fabric comprising a plurality of virtual output queues for queuing packets based on the respective input ports on which the packets are received and the respective output ports for which the packets are destined; and a plurality of schedulers for computing packet schedules for use by the switching fabric in switching packets, wherein the schedulers are active during timeslots, wherein during a given timeslot only one of the schedulers is active for exchanging information with the switching fabric;

wherein each of the schedulers is configured to, during a current timeslot in which the scheduler is active:

receive, from the switching fabric, packet arrival information for packets arriving at the virtual output queues during the current timeslot; and provide, to the switching fabric, a packet schedule for use by the switching fabric in switching packets from selected ones of the virtual output queues to associated ones of the output ports during the current timeslot, wherein the packet schedule is computed by the scheduler using packet departure information for packets departing from the virtual output queues during at least one previous timeslot during which the scheduler was active and packet arrival information for packets arriving at the virtual output queues during at least one previous timeslot during which the scheduler was active.

2. The apparatus of claim 1, wherein each of the schedulers is configured to:

determine the packet departure information for the current timeslot from the packet schedule.

3. The apparatus of claim 1, wherein each scheduler comprises a respective plurality of counters;

wherein, for each scheduler, the plurality of counters of the scheduler are associated with the respective plurality of virtual output queues.

4. The apparatus of claim 3, wherein each of the schedulers is configured to:

during the current timeslot in which the scheduler is active, update counters of the scheduler using the packet departure information for packets departing from the virtual output queues during the current timeslot and the packet arrival information for packets arriving to the virtual output queues during the current timeslot.

5. The apparatus of claim 1, wherein the schedulers become active in a round-robin manner.

6. The apparatus of claim 1, wherein each of the schedulers is configured to:

compute the packet schedule for the current timeslot during a plurality of timeslots between a previous timeslot in which the scheduler was active and the current timeslot.

7. The apparatus of claim 1, wherein each of the schedulers is configured to:

compute a next packet schedule over a plurality of timeslots between the current timeslot in which the scheduler is active and a next timeslot in which the scheduler is active.

8. The apparatus of claim 7, wherein each of the schedulers is configured to:

compute the next packet schedule using packet arrival information associated with the current timeslot and packet departure information associated with the current timeslot.

9. The apparatus of claim 1, wherein each of the schedulers is configured to:

compute the packet schedule for the current timeslot using a maximum weight matching algorithm.

10. The apparatus of claim 9, wherein the maximum weight matching algorithm uses values of the counters, of the scheduler computing the packet schedule, as weights.

11. A method for switching packets via a switching fabric, the switching fabric comprising a plurality of virtual output queues for queuing packets being switched between a plurality of input ports and a plurality of output ports, the switching fabric having a plurality of schedulers associated therewith, the method comprising:

queuing packets received during a current timeslot, wherein the packets are queued using the virtual output queues based on the respective input ports on which the packets are received and the respective output ports for which the packets are destined; and polling one of the schedulers for a current packet schedule for use in switching packets during the current time slot, wherein the current packet schedule is computed using packet departure information for packets departing from the virtual output queues during at least one previous timeslot during which the polled one of the schedulers was active and packet arrival information for packets arriving at the virtual output queues during at least one previous timeslot during which the polled one of the schedulers was active; and switching packets from selected ones of the virtual output queues to associated ones of the output ports using the current packet schedule.

12. The method of claim 11, further comprising:

providing current packet arrival information to the polled one of the schedulers during the current timeslot, wherein the current packet arrival information identifies packets arriving at the virtual output queues during the current timeslot.

13. The method of claim 12, further comprising:

receiving, at the polled one of the schedulers, the current packet arrival information; and updating, at the polled one of the schedulers, selected ones of a plurality of counters associated with respective ones of the virtual output queues associated with input ports on which packets were received during the current timeslot, wherein the selected ones of the counters are updated using the packet arrival information.

14. The method of claim 11, further comprising:

updating, at the polled one of the schedulers, selected ones of a plurality of counters associated with respective ones of the virtual output queues associated with output ports on which packets were transmitted during the current timeslot, wherein the selected ones of the counters are updated using the current packet schedule.

15. The method of claim 11, further comprising:

computing, at the polled one of the schedulers, a next packet schedule, wherein the polled one of the schedulers computes the next packet schedule over a plurality of timeslots between the current timeslot in which the polled one of the schedulers is polled and a next timeslot in which the polled one of the schedulers is polled.

16. A method for switching packets though a switching fabric, the switching fabric comprising a plurality of virtual output queues and having a plurality of schedulers associated therewith, wherein for one of the schedulers active during a current timeslot the method comprises:

providing a current packet schedule from the active one of the schedulers to the switching fabric during the current timeslot, wherein the current packet schedule identifies selected ones of the virtual output queues from which packets are scheduled to depart during the current timeslot;

receiving packet arrival information at the active one of the schedulers from the switching fabric during the current timeslot, wherein the packet arrival information identifies selected ones of the virtual output queues at which packets arrive during the current timeslot; and computing a next packet schedule using the current packet schedule and the packet arrival information.

17. The method of claim 16, wherein the schedulers become active in a round-robin manner in response to polling by the switching fabric.

18. The method of claim 16, wherein the current packet schedule is computed using packet departure information for packets departing from the virtual output queues during at least one previous timeslot during which the active one of the schedulers was active and packet arrival information for packets arriving at the virtual output queues during at least one previous timeslot during which the active one of the schedulers was active.

19. The method of claim 16, wherein the one of the schedulers active during the current timeslot computes the next packet schedule using a maximum weight matching algorithm.

20. The method of claim 16, wherein the active one of the schedulers computes the next packet schedule over a plurality of timeslots between the current timeslot in which the active one of the schedulers is active and a next timeslot in which the active one of the schedulers is active.

* * * * *